(12) United States Patent
Hirsch

(10) Patent No.: US 6,426,111 B1
(45) Date of Patent: Jul. 30, 2002

(54) EFFERVESCENT MIXTURES AND METHODS OF MAKING

(76) Inventor: Gerald Phillip Hirsch, 3204 Hilton Dr., Pinebluff, AR (US) 71602-9375

( * ) Notice: Subject to any disclaimer, the term of this patent is extended or adjusted under 35 U.S.C. 154(b) by 0 days.

(21) Appl. No.: 09/584,959

(22) Filed: Jun. 2, 2000

(51) Int. Cl.$^7$ .............................. A23L 1/304; A23L 2/40
(52) U.S. Cl. ..................... 426/590; 426/74; 426/118; 426/477; 426/516; 426/517; 426/591
(58) Field of Search .................... 426/74, 590, 591, 426/516, 517, 477, 118

(56) References Cited

U.S. PATENT DOCUMENTS

| | | |
|---|---|---|
| 3,667,962 A * | 6/1972 | Fritzberg et al. ............ 426/591 |
| 4,671,972 A | 6/1987 | Schobel et al. |
| 4,824,664 A | 4/1989 | Tarral et al. |
| 4,850,872 A | 7/1989 | Goldman et al. |
| 4,853,211 A | 8/1989 | Kurobe et al. |

* cited by examiner

*Primary Examiner*—Helen Pratt

(57) ABSTRACT

This invention describes compositions of meltable organic acid and carbonate salt suitable for providing effervescence when dissolved in water and protection for additional ingredients from oxidation or reaction with atmospheric moisture during storage. In the production of stable chlorine tablets citric acid is melted then mixed with powdered carbonate and the viscous combination then combined with hypochlorite producing compounds such as calcium hypochlorite or halazone to form stable forms suitable for use in disinfecting applications. Melted acid-bicarbonate mixtures are used to make instant carbonated drinks wherein evolved carbonate is trapped in a closed container to improve the level of carbonation.

24 Claims, No Drawings

EFFERVESCENT MIXTURES AND METHODS OF MAKING

RELATED APPLICATIONS

Effervescent mixtures made by this invention are used to encapsulate hypochlorite releasing compounds for use in disinfecting as described in co-pending applications "Halazone Disinfecting Systems", and "Tricalcium Hydrogen Tetraphosphate Buffered Disinfectants" and for use in mouthwash preparations as described in co-pending application "Cavity Detecting Mouthwash and Cold Prevention".

FIELD OF INVENTION

This invention relates to the manufacture and use of a composition of citric acid and carbonate salt for the production of effervescent products, especially those compatible for use with calcium hypochlorite for use in the disinfecting of water for consumption.

BACKGROUND

Effervescent tablets have been made to effect the rapid dissolution of drugs and for the production of carbonate beverages. Some years ago a sweetened and flavored tablet that formed a carbonated beverage was sold under the trade name "Fizzies". A popular antacid, Alka-Seltzer, uses effervescence to cause rapid dissolution of the active ingredients. The conditions usually employed require only that the effervescence distribute soluble components with the solution. Effervescent tablets are used to improve the cleaning rate for dentures.

The patent to Schobel, et al (U.S. Pat. No. 4,671,972), describes a composition and method of manufacture of tablets suitable for the cleansing of dentures by providing a chlorine odor inactivator. This patent uses dichloroisocyanurate as the chlorine generator.

The patent to Kurobe, et al (U.S. Pat. No. 4,853,211), describes effervescent compositions for vaginal suppositories which include solid acids, drying agents of the sodium sulfate type, and bicarbonate salts. No oxidizing agents are included. Components are mixed and tableted together. The presence of drying agent reduces swelling on storage of the tablet.

The patent to Goldman and Nathanson (U.S. Pat. No. 4,850,872) describes a method of preparing a tooth for capping which utilizes a chelating agent including citric acid and ethylenediamine followed by flushing with a solution of sodium hypochlorite with surface active agents and emulsifiers.

The prior mixing of citric acid with alkali metal carbonate or bicarbonate to form a granular effervescent mixture is accomplished by the addition of water and stopping the reaction by vacuum drying is described in U.S. Pat. No. 4,824,664.

Previous methods of providing effervescent compositions rely on mixing powders of acid producing solid and carbonate source. As the mixture disintegrates, particles can separate. Undissolved acid must first dissolve and the acidic solution reach unreacted carbonate to achieve full effervescent. These limitations are overcome and an efficient method of effervescent product manufacture are achieved by using a meltable acid source such as citric acid. Melting said acid around fine particles of carbonate salt provides a more intimate contact for effervescence. Also the melted acid and solid carbonate can be extruded, These and other advantageous features are describe below.

Specification

Effervescent products have several advantages. One is to provide carbonate to beverages where the carbon dioxide evolved in acidic solutions stimulates the nose and throat when consumed. The second purpose is facilitate the distribution of soluble materials. A third purpose is to stimulate the suspension of particulate matter. Usually it is sufficient to compress a powdered carbonate salt with a powdered acid forming constituent so that local concentrations of acid mix with the carbonate salt forming carbon dioxide or by providing a final pH of 6.5 or less and concentration of carbonate that exceed the solubility of carbon dioxide in water resulting in carbon dioxide effervescence. Such systems are not compatible with ingredients that may react with the acid-forming component in the presence of moisture. These also are not suitable for components which are reactive and may cause damage to the container in which the tablet is placed. It is the purpose of this invention to provide a means for improving the reaction between the carbonate salt and the acid forming component allowing for an active local effervescence not present with powder mixtures.

It is a further purpose of this invention to provide a means for allowing the inclusion of reactive species.

It is a further purpose of this invention to provide a means for reducing moisture penetration to a moisture sensitive or moisture reactive constituent.

It is a further purpose of this invention to provide a means for reducing air penetration to a oxygen sensitive constituent.

It is a further purpose of this invention to provide for continuous production of dosage forms.

It is a further purpose of this invention to provide for rapid production of dosage forms.

The following terms are described for definition of the specification herein and claims which follow:

"Aqueous solution" means any solution containing more than 35% water.

"Meltable Acid" means an organic acid which at room temperature is solid which becomes fluid at a temperature below its decomposition point and which when dissolved in an aqueous solution causes the solution to have a pH of less than 6.5.

"Non-Toxic" means safe for human or animal consumption at the concentration administered in usual circumstances for a particular product or less than 3% of the lowest mammalian $LD_{50}$ for components for which toxic effects have not been previously determined.

"Food grade" means a food quality standard as defined by US federal standards as suitable for human consumption.

A "Drying Agent" means a substance which holds water molecules tightly enough to reduce the reaction rate of other ingredients for which water is a solvent, catalyst or reactant. Anhydrous sodium sulfate is one example.

"Component for dissolution or suspension" means a solid or liquid comprising one or more ingredients for which it is desired that said ingredients be dissolved or suspended when the effervescent components are dissolved in water thus freeing said entrained ingredients.

A "low calorie sweetener" is one that has sweetness near that of sugar with less and 10% of the caloric value of the equivalent amount of sugar. Aspartame, Acesulfame are examples of synthetic low calorie sweeteners and Acerola cherry extract and stevioside extracted from the stevia plant are examples of natural low calorie sweeteners.

Meltable acids, when heated, and then mixed with carbonate or bicarbonate salt act as moldable plastics, giving a choice of shape of the overall product, rigidity at room temperature, and reduced permeability for contained components and external substances. By combining the carbonate directly with the acid an intimate relationship is established which when the material is dissolved in an aqueous solution provides a much better effervescence than when separate layers are used or when separate particles of acid and carbonate are physically mixed without fusion. Examples of meltable acids are citric acid, malic acid, and oxalic acid. Oxalic acid is toxic because of its binding properties for calcium and therefore is not suitable for use in products to be consumed by animals or humans.

Products which benefit from improved effervescence are those in which carbonation is desired, those in which rapid dissolution is desired and those for which the carbonate-acid mixture prevents contact between the acid and an additional ingredient. Specific examples are: carbonated beverages, bath tablets, effervescent suspended drugs, and oxidative materials, such as calcium hypochlorite which may otherwise react with or interact with the container. Calcium hypochlorite releases chlorine which reacts with paper and other organic materials. Calcium hypochlorite if mixed directly with melted citric acid catches fire! Solid calcium hypochlorite causes spontaneous combustion with many organic compounds with the exception of mineral oil.

Products which benefit from the protective layer of solid acid are those which are subject to oxidative effects, liquids, and those which might otherwise evaporate. Examples of these classes include vitamins, and perfumes.

An example of the extrusion method of effervescent manufacture is a heatable metal pressure chamber with bottom opening and attached valve. Attached to the valve is a die or mold to shape the melted carbonate-acid taffy in the desired form when the valve is opened after the acid has been heated. Continuous molding is a distinct advantage but a batch process is also useful. For the continuous molding method a movable belt or surface is place adjacent to the exit die allowing the extruded material to cool without change in structure. Active cooling of the extruded product may be accomplished by cooling the belt or passing the extruded product through a cold dry chamber.

As a preferred embodiment soluble carbonate salt is mixed with meltable acid in a chamber and as the mixture is extruded in two layers after melting and mixing of the acid with carbonate, components for dissolution or suspension desired for inclusion in the product are placed between two layers resulting in a sandwich covering of the component for dissolution or suspension by the effervescent acid-carbonate mixture. Compressing viscous meltable acid periodically perpendicular to the extrusion direction produces square or rectangular pillow shaped pieces, thereby allowing for controlled dosage of the components for inclusion.

As an additional preferred embodiment said melted acid-carbonate mixture is extruded circumferencially around the component for dissolution or suspension and dosage portions separated by squeezing the melted acid-carbonate thus providing a dosage form in pillow shape. In this case it is necessary that the melted acid-carbonate be thick enough to provide closure at the pillow ends or that the component be introduce to the extrusion process on a controlled, intermittent basis and that the end fusion of the pillow be coordinated so as to compress the melted acid-carbonate between individual component portions.

In another preferred embodiment an effervescent composition is extruded and surrounded by a thin layer of slowly dissolving, water soluble composition and the material shaped by constricting the extrusion at intervals to separate the extrusion into an elongated rod with bullet shaped ends. After separation the rod is cut in half so the center core of effervescent material is exposed. When placed in water the effervescent inner layer produces carbon dioxide gas which caused the rod to move through the water. A preferred example of such a product is one in which sodium or potassium carbonate is mixed with citric acid in a ratio that provides a pH of 4 to 6 when fully dissolved and has sucrose as a surrounding layer. Flavoring and sweetening agent in addition to the sucrose can be added during production of the effervescent core. In another preferred case the sucrose layer is replaced by citric acid and the citric acid is applied in production as a thick melted liquid form. The size of the product is adjusted so that the product can produce an amount of carbonation desired for a carbonated drink of particular volume of water.

When anhydrous citric acid is used for making effervescent products the citric acid remains as a solid after being melted and cooled. By contrast, when citric acid monohydrate is mixed with carbonate salts a small amount of water reacts with the carbonate and a small amount of carbon dioxide is released. When cooled the resulting composite has light weight and rapidly dissolves with effervescence. Effervescent products made with citric acid monohydrate float and provide a means for keeping the composite from settling to the bottom of a vessel containing water.

In a preferred embodiment disinfective products are made using calcium hypochlorite wherein under dry conditions powdered hypochlorite salt is mixed with taffy formed from anhydrous citric acid and sufficient carbonate salt to provide a desired pH and the desired amount of hypochlorite when a finite amount of the composite is dissolved in a particular amount of water.

Example 1 compares small batch preparation of three alkali metal carbonates in the preparation of coated effervescent bath tablets. Two hundred grams of anhydrous citric acid was melted to 125° C. then mixed with 150 grams of sodium, or calcium or potassium carbonate. After mixing and while the mixture was still malleable 80 grams in the case of sodium or 40 grams in the case of calcium or potassium of granular calcium hypochlorite was added with mixing. Chlorine vapor originating from this mixing was exhausted. While still in taffy form the mixture was flattened and scored for later cleavage. When cooled individual wafers of effervescent encapsulate calcium hypochlorite were separated and stored in closed containers. Example 1 shows various characteristics of these preparations used to produce chlorine when dissolved in a standard bath tub filled with water.

EXAMPLE 1

Preparations of Alkali Metal Carbonate Bath Tablets

| Alkali Metal Carbonate | Sodium | Calcium | Potassium |
| --- | --- | --- | --- |
| Carbonate form | sm. granules | powder | granules |
| Average tablet weight | 7.6 gm | 8.4 gm | 4.8 gm |
| Approx. size in inches | 1 × 1 × ¼ | 1 × 1 × ¼ | ½ × ½ × ⅜ |
| pH after dissolution | 6.5 | 5.0 | 6.1 |

| Alkali Metal Carbonate | Sodium | Calcium | Potassium |
|---|---|---|---|
| Chlorine (OTO measured) | 5 ppm | 12 ppm | 4 ppm |
| Time to dissolve (minutes) | 2.25 | 5 | 1.5 |
| Effervescence | good | slow | good |

While the combination of citric acid with powdered calcium carbonate was slower to dissolve less foaming of the melted mixture occurred and less chlorine vapor was produced during the additions of calcium hypochlorite. If a bath tablet is added to the bath water just after water is turned on the tablet will be dissolved by the time the bath is full. The amount of hypochlorite added during the preparation of the bath tablet and the size of the tablet should be adjusted to provide the desired amount of chlorine. For a single person at level of 10 parts per million of chlorine will provide a residual of 1 parts per million of chlorine at the end of a modest bathing period, 2 to 5 minutes.

In another preferred embodiment effervescent calcium hypochlorite made with anhydrous citric acid is manufactured by extrusion or other means and then surrounded by effervescent material made with citric acid monohydrate made effervescent with carbonate salt. The combined product floats and keeps the hypochlorite from coming in contact with the bottom of the vessel. This feature allows such a product to be used in plastic tubs and spas where contact between the hypochlorite material and the surface would result in undesirable discoloration.

In addition to calcium hypochlorite and other hypochlorite salts that can be used for producing chlorine when dissolved in water, other compounds which produce chlorine when dissolved are suitable for protection by encapsulation. Halazone is one such example. It can be determined whether hypochlorite is produced by a particular chloramine by measuring how much OTO (0.1% orthotolidine in 0.3 M hydrochloric acid) reactive material is destroyed by peroxide. Peroxide rapidly destroys hypochlorite.

Halazone protected by citric acid-carbonate or citric acid bicarbonate mixtures has the benefit of improved stability in the solid state because chlorine evolution is reduced. Halazone becomes more soluble in water as the acidity is increased, pH lowered, so by using an effervescent product with a particular acidic final pH the saturation level of halazone can be controlled to a level corresponding to its saturation.

For the manufacture of products under conditions of high humidity it may be desirable to add an drying agent to the citric acid-carbonate or citric acid bicarbonate mixtures.

I have discovered a simple method to improve the use of solid, artificially sweetened, and flavored citric acid bicarbonate mixtures for production of carbonated beverages. When such solid mixtures are placed in water considerable effervescence is produced. However much of the evolved $CO_2$ escapes during dissolution. If the mixture, powder, tablet, or other solid form is placed in water in a closable container and the container closed during dissolution the evolved carbon dioxide is trapped and becomes dissolved in the water. In a preferred embodiment the self generated pressurized carbonated drink container is placed in a cold environment to provide a cold carbonated drink. Artificial sweeteners are preferred because they allow the total weight of the carbonate producing solid to be smaller, but powdered sugar can also be used. In a preferred embodiment the effervescent mixture is made with a mixture of potassium and sodium bicarbonate because just 2-twenty ounce servings of beverage using only sodium bicarbonate would provide the total recommended daily allowance of sodium and many people drink more that two twenty-ounce drinks per day. In another preferred embodiment carbonated drinks as described above are made using the methods described herein for producing effervescent products using food grade melted acid with a mixture of food grade sodium and potassium bicarbonates.

In another preferred embodiment some of the carbonate needed to produce the desired amount of carbonation is generate from calcium carbonate. This calcium rich product may be desirable for women who for one reason or another need to increase their daily consumption of calcium.

In another preferred embodiment a composition suitable as a sports drink is made as describe herein which said composition contains in addition minerals lost in sweat. An man of average weight doing light work would produce about 100 ml of sweat per hour in heat of 29 degrees C. or 84 degrees F. More vigorous exercise at higher temperatures causes even faster rates of sweat production. To accommodate various mineral replacement needs it is preferred that a 16 ounce drink provide from 50% to 400% of minerals lost by a man doing one hour of light work in moderate heat of 29° C. heat. The "Scientific Tables" edited by K. Diem and C. Lentner, $7^{th}$ edition, pages 679–680, published by Ciba Geigy, Basle, Switzerland, 1 970, give the following average minerals in sweat adjusted to 100 ml of sweat:

Average Mineral Content of 100 ml Sweat

| Chloride | 105 mg |
|---|---|
| Phosphate | 1.4 mg |
| Sulfate | 4.5 mg |
| Bromide | 0.035 mg |
| Fluoride | 0.09 mg |
| Iodine | 0.95 micrograms |
| Potassium | 29 mg |
| Sodium | 83 mg |
| Calcium | 6 mg |
| Magnesium | 4.8 mg |
| Iron | 0.11 mg |
| Copper | 6 micrograms |
| Manganese | 6 micrograms |
| Zinc | 0.11 mg |

In another preferred embodiment effervescent tablets, pillows or rods are made with at least one flavoring ingredient and optionally a sweetening ingredients wherein the size of the product is designed to be added to an averaged side glass or bottle of wine. Such products allow conversion of wine into a wine cooler. In another preferred embodiment a similar product without flavoring or sweetener is used to make wine into champagne. This product can also be used to re-carbonate a drink which has lost it carbonation. In another preferred embodiment spice flavors are mixed into effervescent dosage forms to allow beer to be flavored and to provide extra carbonation to beer.

In another preferred embodiment an effervescent dosage form is made to be added to fruit juice, more preferably in a closable container. By carbonating fruit juice it is easier for parents to switch their children from low nutrient soft drinks to nutrient rich fruit juice.

In all of the above examples where it is desired to provide a carbonation to make drinks or to carbonate other liquids dosage forms are manufactured to be used with a particular amount of fluid, preferably in a closed container which is nearly full with solution. Thus for example instant colas effervescent tablets or other dosage forms are made in several sizes, such as in amounts to be dissolved in 8 ounces, 16 ounces, 2 liter and 3 liter volumes.

The examples described above are representative of a broad class of products which can be made using my discovery of combining meltable acids and carbonate salts. The ability to extrude the melted acid greatly improves methods of production because extrusion systems are well developed and comprise a significant part of the plastics industry. Extrusion methods also facilitate the production of multi-layered composites products as well as varied shapes which result from constriction the extruded material when soft. The intimate contact of meltable acid and powder carbonate salt greatly improves effervescence. Effervescent products made with citric acid monohydrate float. Such floating material may combined with other mixtures to deposit ingredients at the surface of water and reduce contact with the bottom of a vessel holding the water.

Thus having described my invention,

I claim:

1. A composition of matter comprising:
   (a) a meltable organic acid which has been melted with solid ingredients (b), and (c),
   (b) an alkali metal carbonate or bicarbonate salt,
   (c) a component for dissolution or suspension to be dissolved or suspended in water,
   wherein the ratio of melted acid to carbonate when dissolved in water provides sufficient acid to cause carbon dioxide evolution and said component for dissolution or suspension is added after mixing component (b) if said component is reactive with said meltable acid.

2. A composition of matter according to claim 1, further comprising at least one drying agent selected from the group consisting of anhydrous sodium sulfate, water soluble silica, and dried zeolite.

3. A composition of matter according to claim 2, wherein said acid, said carbonate salt and said drying agent are non-toxic.

4. A composition of matter as in claim 1 wherein said melted acid is anhydrous citric acid.

5. A composition of matter as in claim 1, wherein said acid, and said carbonate salt are non-toxic.

6. A composition of matter as in claim 5, wherein said melted acid is citric acid and said carbonate salt is at least one selected from the group sodium carbonate, sodium bicarbonate, potassium carbonate and potassium bicarbonate.

7. A composition of matter according to claim 5, wherein said melted acid is citric acid monohydrate.

8. A composition of matter as in claim 1, wherein said component for dissolution or suspension is one to be consumed.

9. A composition of matter according to claim 1 wherein said component for dissolution or suspension is a water soluble hypochlorite producing compound.

10. A composition of matter according to claim 9 wherein said water soluble hypochlorite producing compound is selected from the group consisting of calcium hypochlorite, chloro-isocyanurate, chloramine T and halazone.

11. A composition of matter according to claim 10 wherein said water soluble hypochlorite producing compound is halazone and the ratio of acid to carbonate or bicarbonate is adjusted to provide a particular pH which controls the desired solubility of halazone in the pH range of 4 to 7.

12. A composition of matter according to claim 1, consisting of food grade components including a meltable acid, at least one alkali metal carbonate or bicarbonate salt, at least one flavoring ingredient, an artificial sweetener and optionally including a coloring ingredient.

13. A composition of matter according to claim 12 in dosage form to be dissolved in 16 ounces of water wherein the amount of carbon dioxide evolved exceeds the solubility of carbon dioxide at the pH of the solution, further comprising food grade minerals in an amount of from 50% to 400% of the amounts of such minerals excreted in sweat for an average human male during a two hour period of light work in 29° heat.

14. A method of manufacture of effervescent composition comprising
   (a) placing at least one component for dissolution or suspension to be extruded which is compatible with organic acids, a meltable acid and at least one alkali metal carbonate or bicarbonate salt in a suitable chamber,
   (b) raising the temperature of the mixture until the meltable acid becomes sufficiently fluid and then mixing said ingredients if necessary,
   (c) extruding said mixture into the desired form,
   (d) allowing said extruded mixture to cool.

15. A method according to claim 14 wherein the ingredients of step (a) are mixed prior to being place in said suitable container or said ingredients are mixed in said container prior to step (b).

16. A method of manufacture of effervescent composition comprising the steps:
   (a) placing a meltable acid and at least one alkali metal carbonate or bicarbonate salt in a suitable chamber;
   (b) raising the temperature of the mixture until the meltable acid becomes sufficiently fluid; and optionally mixing said ingredients,
   (c) extruding said mixture into the desired form;
   (d) introducing at least one component for dissolution or suspension into said extruded mixture of acid and carbonate or bicarbonate
   (e) allowing said mixture with said entrained component to cool.

17. A method according to claim 16 wherein step (c) and (d) are:
   (c) extruding said mixture into two layers,
   (d) inserting at least one component for dissolution or suspension between said two layers and forcing said two layers together so as to encapsulate said component.

18. A method according to claim 17 in which said component for dissolution or suspension is intermittently inserted to allow said additional ingredient to be surrounded by the citric acid carbonate or citric acid bicarbonate matrix.

19. A method according to claim 16 wherein said extruded material is separated into dosage forms prior to step (e).

20. A method according to claim 19, where said extrusion means is made in rounded form and said separating into dosage forms is accomplished by pinching that compresses said citric acid carbonate mixture or acid bicarbonate mixture thin enough that units can be easily separated after cooling.

21. A method according to claim 16, wherein said extrusion is made in rounded form.

22. A method for making a carbonated drink of food grade ingredients for consumption comprising:

(a) producing a composition consisting of melted citric acid, carbonate or bicarbonate matrix, at least one flavoring ingredient, at least one coloring ingredient, at least natural or artificial low calorie sweetener and optionally a water soluble drying ingredient, wherein the final pH of said composition of matter is between 3 and 7.

(b) distributing said composition in discrete dosage forms suitable for making a drink of from 100 ml to 3 liters, (c) placing one of said discrete dosage forms of said composition in a closable container of such capacity that the amount of carbon dioxide produced when water nearly fills said container exceeds the solubility of carbon dioxide at 1 atmosphere pressure in an amount of water equal to the size of said container, (d) nearly filling said closable container with potable water, (e) closing said container just after adding said water, and allowing said carbon dioxide to dissolve in said water and pressurize said closed container.

23. A method according to claim 22 wherein said carbonate is at least one selected from the group sodium bicarbonate, potassium bicarbonate and calcium carbonate.

24. A method of claim 23 wherein said carbonate is at least 20% and up to 80% calcium carbonate and the remainder at least one selected from sodium bicarbonate and potassium bicarbonate.

* * * * *